United States Patent [19]

Nguyen et al.

[11] Patent Number: 5,172,092
[45] Date of Patent: Dec. 15, 1992

[54] SELECTIVE CALL RECEIVER HAVING AUDIBLE AND TACTILE ALERTS

[75] Inventors: Tuan K. Nguyen; Thomas J. Rollins; Harold Holden, all of Boca Raton; Charles W. Mooney, Lake Worth, all of Fla.

[73] Assignee: Motorola, Inc., Schaumburg, Ill.

[21] Appl. No.: 515,036

[22] Filed: Apr. 26, 1990

[51] Int. Cl.[5] .......................... H04Q 1/30; G08B 5/22
[52] U.S. Cl. ............................ 340/311.1; 340/825.44; 340/825.46; 340/407
[58] Field of Search ................ 340/311.1, 825.11, 407, 340/404, 388, 390, 391, 393, 825.46, 825.44; 340/393; 116/137 A, 137 R, DIG. 17

[56] References Cited

U.S. PATENT DOCUMENTS

| | | | |
|---|---|---|---|
| 4,378,551 | 3/1983 | Drapac | 340/311.1 |
| 4,385,295 | 5/1983 | Willard et al. | 340/311.1 X |
| 4,731,603 | 3/1988 | McRae et al. | 340/407 |
| 4,786,889 | 11/1988 | Hayasaka | 340/311.1 |
| 4,823,110 | 4/1989 | Dorward et al. | 340/388 |
| 4,851,836 | 7/1989 | Wilkinson et al. | 340/407 |
| 4,918,438 | 4/1990 | Yamasaki | 340/407 |
| 4,931,765 | 6/1990 | Rollins et al. | 340/407 |

OTHER PUBLICATIONS

Motorola Service Manual 68P81047C75-A, "'Bravo' Series, Numeric Display Pagers, 138-174 MHz", © 1986, p. 15.

Motorola Service Manual 68P81046C35-A, "'Bravo' Series, Binary GSC Radio Pagers, Tone and Silent Alert, 406-420 MHz, 450-512 MHz", © 1988, p. 11.

Motorola Service Manual 68P81006B85-C "'Bravo' Series, Numeric Display Pagers, A05JRB/C Models, 929-932 MHz", © 1989, p. 15.

Primary Examiner—Donnie L. Crosland
Attorney, Agent, or Firm—Jose Gutman; William E. Koch; Thomas G. Berry

[57] ABSTRACT

A selective call receiver includes a vibrator (206) for generating alerts. The vibrator (206) includes a housing (402), a flexible member (2) within the housing (402) and coupled thereto, and a moving member (404) coupled to the flexible member (2) for movement about an equilibrium position, the moving member (404) including a permanent magnet (410). An actuator includes an electromagnet (412) for causing the permanent magnet (410) and the moving member (404) to move at a first frequency for generating an audible alert and at a second frequency for generating a sub-audible or tactile alert. The movement at the second frequency is substantially transferred to the housing (402) for generating the sub-audible or tactile alert.

18 Claims, 4 Drawing Sheets

— PRIOR ART —

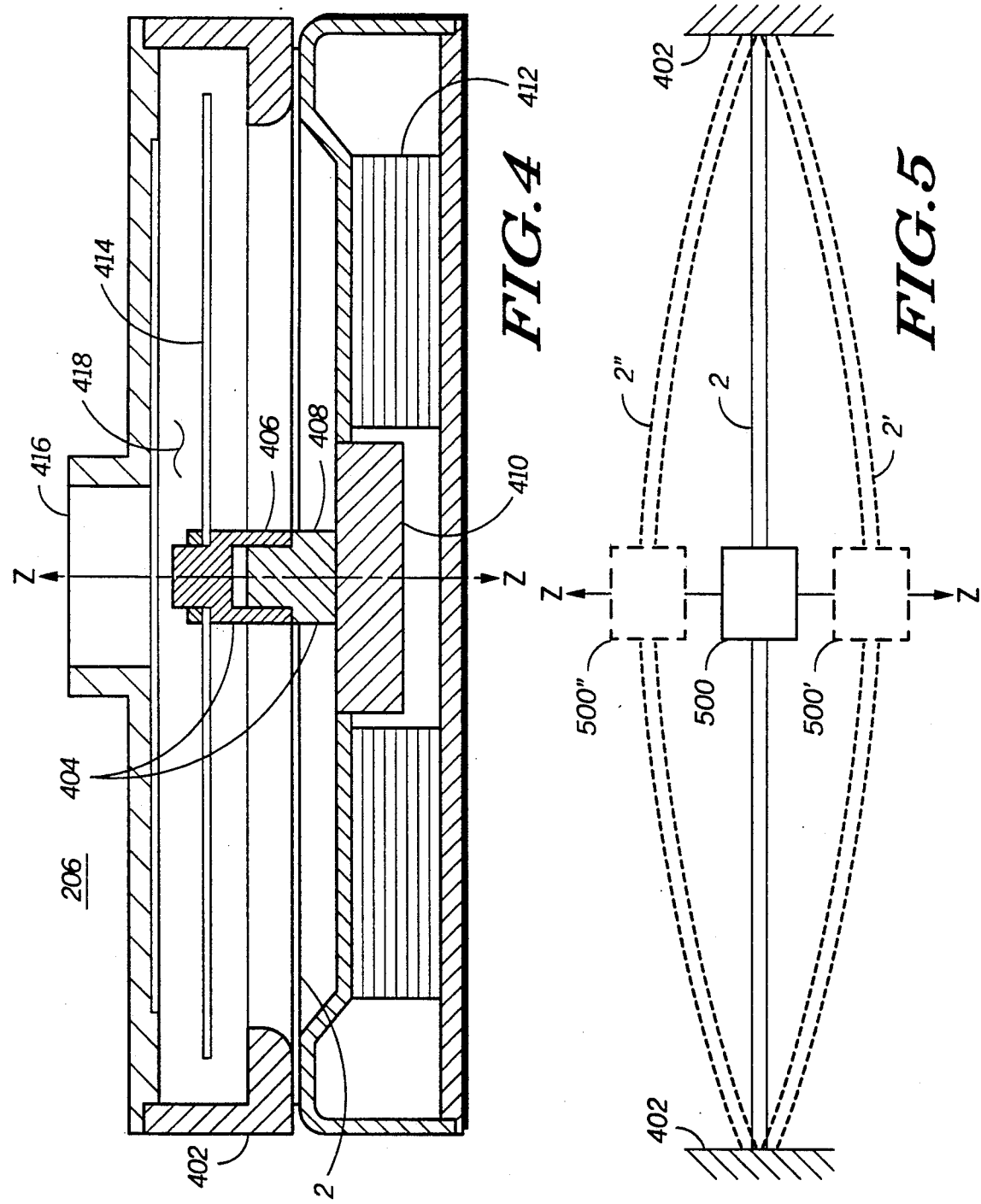

SELECTIVE CALL RECEIVER HAVING AUDIBLE AND TACTILE ALERTS

FIELD OF THE INVENTION

This invention relates in general to the field of message indicators, and more specifically, to vibrators and audible alert generators for selective call receivers.

BACKGROUND OF THE INVENTION

Selective call receivers, e.g. pagers, typically alert a user upon the occurrence of one of a number of possible events. The alert can be an audible or a tactile alert. The latter alert provides a silent alert signal to the user.

The current art requires two separate devices within the selective call receiver to perform the two alerts. Referring to FIG. 1, conventional designs require a vibrator motor 100 comprising a cylindrical housing 102 having a rotating shaft 104 attached to an external unbalanced counterweight 106 to provide the "silent" tactile alert. The cylindrical body 102 is held in place on a printed circuit board 108 by motor bracket 110. Additionally, a separate transducer (or amplifier and speaker system) is required to provide the audible alert.

The required two devices add substantial size and cost to the receiver. Also, they increase the amount of time required to assemble and to service the product. Ultimately, the reliability of receivers is degraded by the inclusion of these two electro-mechanical devices.

Conventional message alert designs also impede miniaturization, which is a significant drawback to modern receiver design trends. It is important that the overall size be reduced without reducing the vibration level required for the "silent" tactile alert, since this would defeat the advantage of the size reduction.

Accordingly, there exists a need in the art for a single, high reliability device to provide both the audible and tactile alerts.

SUMMARY OF THE INVENTION

In carrying out one form of this invention, there is provided an apparatus for providing audible and tactile alerts comprising a housing, a flexible member within the housing and coupled thereto, and a moving member coupled to the flexible member for movement about an equilibrium position, the moving member including a permanent magnet. The apparatus also comprises actuator means coupled to the moving member for causing the moving member to move at a first frequency for generating an audible alert and at a second frequency for generating a sub-audible or tactile alert. The actuator means includes electromagnet means for causing the permanent magnet and the moving member to move, the movement at the second frequency being substantially transferred to the housing for generating the sub-audible or tactile alert.

BRIEF DESCRIPTION OF THE DRAWINGS

FIG. 4 is a cross-sectional view of the message indicator according to the present invention.

FIG. 5 is a side view of the armature, member, and diaphragm in a vibratory motion.

DETAILED DESCRIPTION OF THE INVENTION

Figure 2:
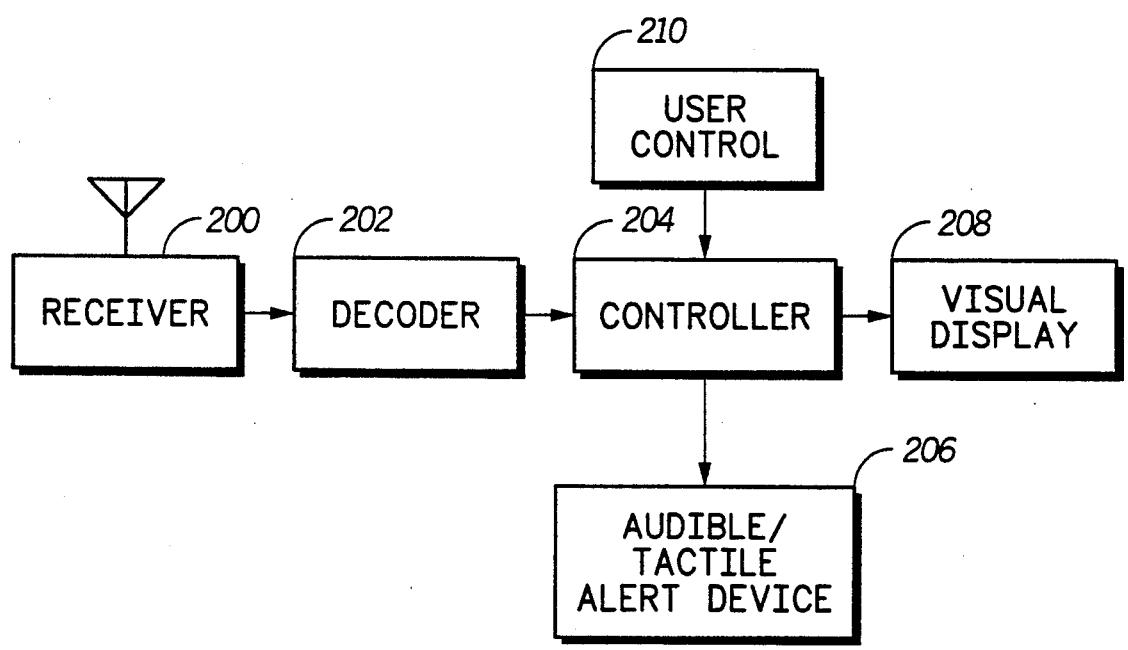
FIG. 2 is a block diagram of a selective call receiver in accordance with the present invention.

Referring to FIG. 2, a selective call receiver, e.g. a pager, comprises an RF receiver 200 for receiving and demodulating a signal, a decoder 202 for decoding the signal, and a controller 204 for presenting an alert and message contained within the signal or an alert only via one of a plurality of output devices 206, 208. These output devices include one or more of an audible alert 206, a tactile alert 206, and a visual alert 208. Additionally, the alert may be presented in response to selection of a user control 210, e.g. pushing a button or moving a slide switch. This basic function of a selective call receiver is well known to those skilled in the art.

According to the invention, the controller 204 may initiate an alert signal via the audible/tactile alert device 206, to provide either an audible alert or a tactile alert. The alert device 206 responds to a first frequency to provide the audible alert, and to a second frequency to provide a sub-audible or tactile alert. The structure and operation of the audible/tactile alert device 206 is hereinafter more fully described by reference to FIGS. 3, 4 and 5.

Figure 1:
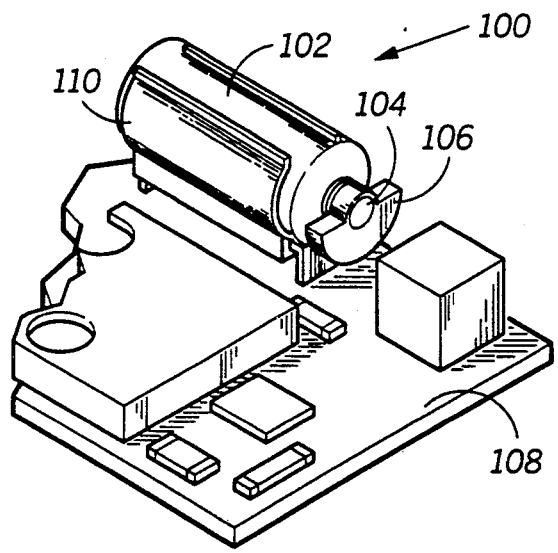
FIG. 1 is a perspective view of a conventional vibrator attached to a printed circuit board.
Figure 3:
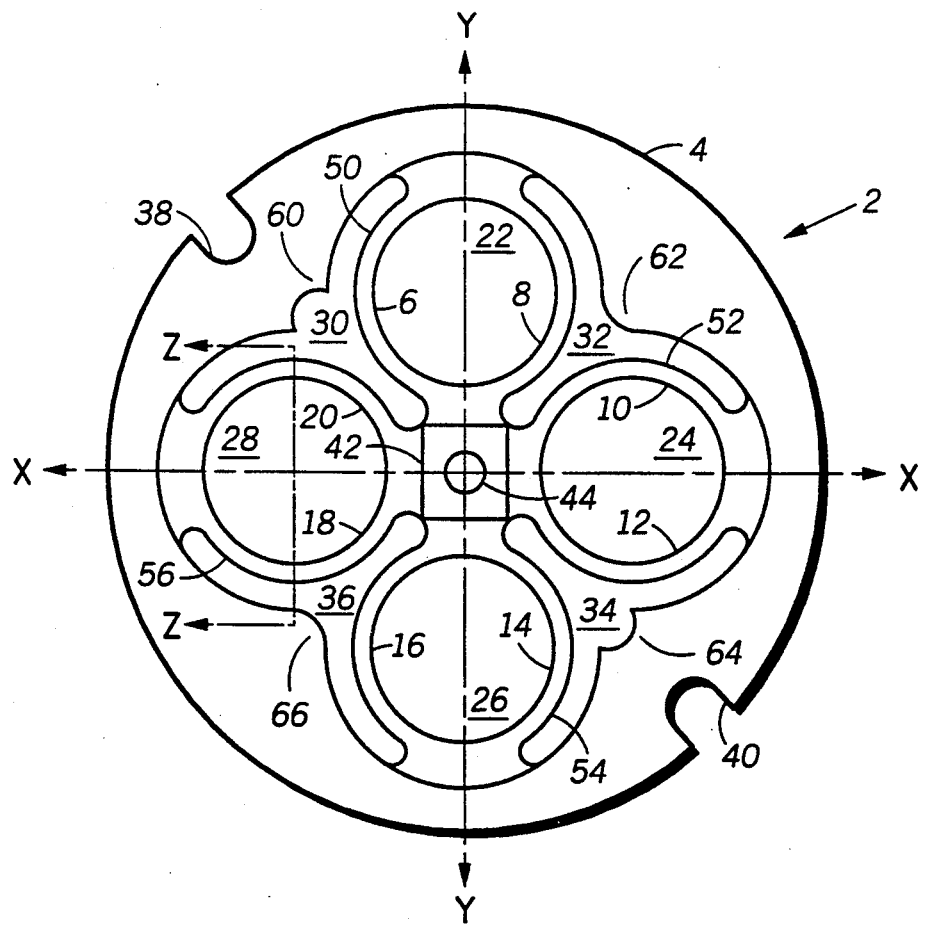
FIG. 3 is a top view of the armature structure according to the present invention.

Referring to FIG. 3, an armature 2 comprises a body 4 including curved, substantially planar springs 50, 52, 54, and 56 integrally positioned therein, an etched surface 42, and an opening 44. The armature 2 may be manufactured by a single piece of metal that is chemically etched using known techniques to form the preferred embodiment. Each of the springs 50, 52, 54, and 56 preferably comprise two members 6 and 8, 10 and 12, 14 and 16, and 18 and 20, respectively. The springs 50, 52, 54, and 56 are formed by circular openings 22, 24, 26, and 28 and curved openings 30, 32, 34, and 36, respectively. In the preferred embodiment, openings 38 and 40 are formed for mounting purposes although other variations could be utilized.

In the preferred embodiment, the armature 2 is made of international nickel alloy 902, with springs 50, 52, 54, and 56, chemically etched to a thickness of approximately 0.003 inches or less. This material is a constant modulus alloy so as to reduce temperature induced frequency changes and force impulse changes. The preferred design of the armature 2 provides a linear spring rate due to the elastic bending of the members 6, 8, 10, 12, 14, 16, 18, and 20. Frequency tuning is preferably accomplished by adjusting the inside diameters of the springs 50, 52, 54, and 56 by a suitable etching, trimming, or grinding process. The ring geometry makes it possible to elongate each of the members 6, 8, 10, 12, 14, 16, 18, and 20 by approximately 0.0015 inches without exceeding the required maximum fatigue stress level of 30,000 psi for the material selected in the preferred embodiment. It should be understood that the shapes and dimensions could change without varying from the intent of the invention.

Referring to FIG. 4, the audible/tactile alert device 206 comprises the armature 2, positioned within a housing 402 and coupled all around the perimeter to the housing 402. A member 404 comprises a top piece 406 and a bottom piece 408, which are preferably constructed of a non-magnetic metal. The top 406 and bottom 408 of the member 404 mate through the opening 44 in the armature 2 (see FIG. 3). The member 404 is thus attached to the armature 2 allowing movement of the member 404 about an equilibrium position.

The bottom piece 408 of the member 404 is also coupled to a magnet 410. The magnet 410 is surrounded by a coil 412 forming an actuator for causing the members to move in response to an alternating current applied to the coil 412.

The top piece 406 of the member 404 is also coupled to a diaphragm 414 located within the housing 402. The diaphragm 414 preferably comprises a substantially flat non-magnetic metal disk, preferably made out of beryllium. An aperture 416 in the housing 402 in combination with the moving diaphragm 414 may be constructed via known techniques with such dimensions as to form a Helmholtz resonator cavity 418. According to the invention, an audible alert may be emitted through the aperture 416 when the member 404 is vibrated at a first frequency. The audible alert, in the preferred embodiment, comprises a signal having a frequency of approximately 3000 Hz.

Referring to FIGS. 3 and 4, the member 404 and the armature 2, in the preferred embodiment, are mechanically tuned to naturally also resonate at a second frequency of approximately 70 Hz. As previously mentioned, the armature 2 is coupled to the housing 402 for transferring movement of the member 404 to the housing to generate a tactile alert. Since 70 Hz comprises generally sub-audible frequency, no audible sound will be heard. That is—the present invention provides a tactile alert by generation of a sub-audible signal.

At mechanical resonance, a maximum amplitude and impulse is provided at a relatively small power consumption. This is due to the restoring force created by tension in the springs 50, 52, 54, and 56 as each member 6, 8, 10, 12, 14, 16, 18, and 20 of the springs 50, 52, 54, and 56, extends approximately 0.0015 inches. The restoring force is balanced by the perimeter of the armature 2, which is coupled to the housing 402. The driving force (unbalanced) is in the axis Z—Z and is typically 10% of the balanced restoring force, which is in the axis X—X and Y—Y. Therefore, the system uses approximately 10% of the stored energy to move the message indicator 206 (and thus the selective call receiver) each cycle, which increases the system's battery life.

According to the invention, the indicator 206 generates an impulse toward the user in one direction as compared to the prior art motor 100 which generates an impulse in all radial directions within the plane of rotational motion of the external unbalanced counterweight 106. Therefore, much of the force generated by the motor 100 is not felt in a tactile sense by the user. An equivalent tactile sensory response is obtained by the present invention while using less power and space than the conventional motor 100.

Referring to FIGS. 4 and 5, the armature 2 is in its stationary (equilibrium) position within message indicator 206 with a mass 500 comprised of the member 404, the magnet 410, and the diaphragm 414. The armature 2 is held substantially rigid to the housing 402 along the perimeter. As the indicator 206 begins to vibrate, the armature 2 and mass 500 will move from its stationary position, along azis Z—Z, to its maximum amplitude as represented by armature 2' and mass 500'. Due to the spring force provided by springs 50, 52, 54, and 56 along the Z—Z axis and the actuating signal applied to the coil 412, the armature 2' and mass 500' will oscillate to the opposed extreme as represented by armature 2" and mass 500". These oscillations produce either the audible alert at the first frequency of approximately 3000 Hz or the tactile alert at the second frequency of approximately 70 Hz.

Figure 6:
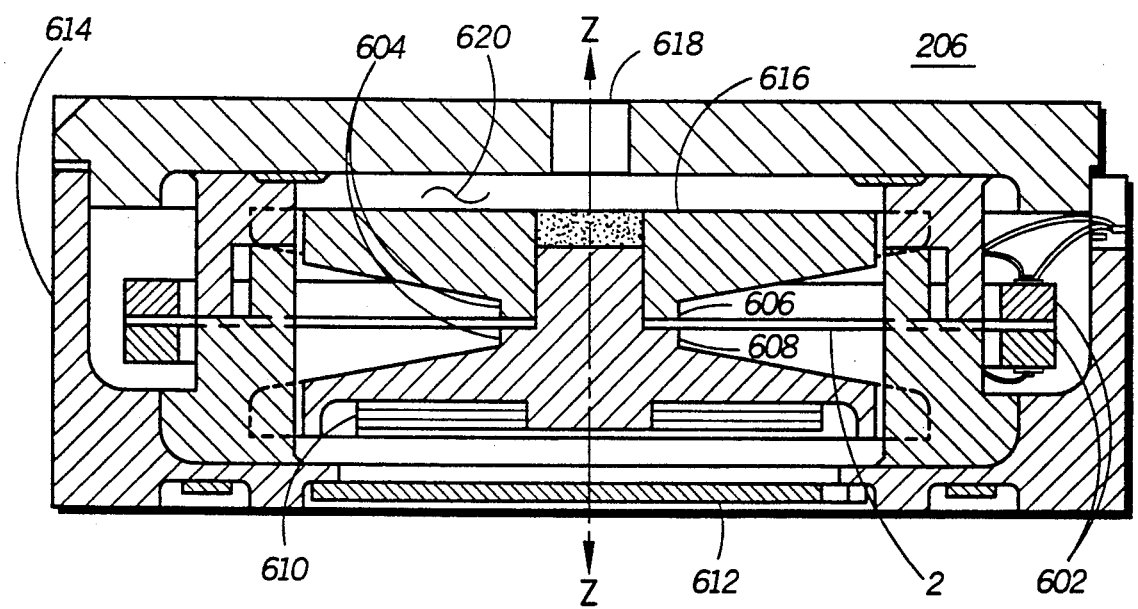
FIG. 6 is a cross-sectional view of an alternate embodiment of the present invention.

Referring to FIG. 6, an alternate embodiment of the invention comprises a piezo-electric mechanism 602 for vibrating the indicator 206. At least one piezo-ceramic ring 602 is coupled to the armature 2. The piezo-ceramic ring 602 is attached to the perimeter of the armature 2 using a high Q mechanical adhesive, such as Armstrong 702. The armature 2 is coupled to a member 604 comprising a top piece 606 and a bottom piece 608, which are preferably constructed of a non-magnetic metal. The top 606 and bottom 608 of the member 604 mate through the opening 44 in the armature 2 (see FIG. 3). Thus, the member 604 is attached to the armature 2 for movement about an equilibrium position.

As can be seen, the armature 2 is positioned between the top 616 and bottom 618 of a housing 614 at four points 60, 62, 64, and 66 (see FIG. 3). This arrangement of the armature 2 and the housing 614 allows the armature 2 to expand in size along the axis X—X and Y—Y, in response to a force applied outwardly around the perimeter of the armature 2. The armature 2 returns to its original dimensions when the force is removed.

The bottom piece 608 of the member 604 is also coupled to a magnet 610. The magnet 610 attracts a fixed metal shield 612, which maintains tension on the armature 2.

According to the invention, an alternating voltage is applied to the piezo-ceramic ring 602 to cause the piezo-ceramic ring 602 to alternately expand in size and return to equilibrium. The induced movement in the armature 2 is along the axis X—X and Y—Y (see FIG. 3). The resulting movement of the member 604 is along the axis Z—Z. The magnetic force between the magnet 610 and the shield 612 maintains tension on the armature 2 while the piezo-ceramic ring 602 expands and returns. Therefore, the piezo-electric mechanism 602 composes an actuator for causing the member 604 to move in response to an alternating voltage applied to the piezo-ceramic ring 602.

Surface 616 of the top piece 606 of the member 604 is substantially flat and operates as a diaphragm 616 located within the housing 614. An aperture 618 in the housing 614 in combination with the moving diaphragm 616 may be constructed via known techniques with such dimensions as to form a Helmholtz resonator cavity 620. According to the invention, an audible alert may be emitted through the aperture 618 when the member 604 is vibrated at a first frequency. The audible alert, in this embodiment, comprises a signal having a frequency of approximately 3000 Hz.

The member 604 and the armature 2, in this embodiment, are mechanically tuned to naturally also resonate at a second frequency of approximately 70 Hz. The armature 2 is coupled to the housing 614 for transferring movement of the member 604 to the housing 614 to generate a tactile alert. Since 70 Hz comprises generally a sub-audible frequency, no audible sound will be heard. That is-the present invention provides a tactile alert by generation of a sub-audible signal.

At mechanical resonance, the energy required to move the armature 2 and member 604 is substantially reduced, thus increasing battery life.

We claim:
1. An apparatus comprising:
   a housing;

a flexible member within the housing and coupled thereto;

a moving member coupled to the flexible member for movement about an equilibrium position, the moving member including a permanent magnet; and actuator means coupled to the moving member for causing the moving member to move at a first frequency for generating an audible alert and at a second frequency for generating a sub-audible or tactile alert, the actuator means including electromagnet means for causing the permanent magnet and the moving member to move, the movement at the second frequency being substantially transferred to the housing for generating the sub-audible or tactile alert.

2. The apparatus according to claim 1 further comprising:

a diaphragm coupled to the moving member and located within the housing for generating the audible alert in response to movement of the moving member.

3. The apparatus according to claim 2 wherein the diaphragm is resonant at the first frequency for generating the audible alert.

4. The apparatus according to claim 1 wherein the housing defines a cavity therewithin with an aperture through the housing for emitting the audible alert.

5. The apparatus according to claim 1 further comprising:

receiver means for receiving a message; and controller means coupled to the receiver means and to the actuator means for presenting the message and one of the audible alert or the sub-audible or tactile alert in response to the message being received.

6. A method for vibrating a moving member coupled to a flexible member, the flexible member located substantially within a housing and coupled thereto, the method comprising the steps of piezo-electrically flexing the flexible member, and thereby vibrating the moving member coupled thereto, at a first frequency for providing an audible alert and at a second frequency for providing a sub-audible or tactile alert, the vibration of the moving member at the second frequency being substantially transferred to the housing for providing the sub-audible or tactile alert.

7. The method according to claim 6 further comprising the step of selecting one of the first frequency or the second frequency for vibrating the moving member.

8. The method according to claim 6 further comprising the step of flexing the flexible member in substantially one direction for moving the moving member in substantially a second direction that is different than the first direction.

9. An apparatus comprising:

a housing;

a flexible member within the housing and coupled thereto;

a moving member coupled to the flexible member for movement about an equilibrium position; and piezo-electric actuator means coupled to the flexible member for causing the flexible member to flex thereby causing the moving member to move, the flexible member flexing at a first frequency or a second frequency for causing the moving member to move at the respective first and second frequency to generate an audible alert and a sub-audible or tactile alert, respectively, the movement at the second frequency being transferred to the housing for generating the sub-audible or tactile alert.

10. The apparatus according to claim 9 further comprising:

a diaphragm coupled to the moving member and located within the housing for generating the audible alert in response to movement of the moving member.

11. The apparatus according to claim 10 wherein the diaphragm is resonant at the first frequency for generating the audible alert.

12. The apparatus according to claim 9 wherein the housing defines a cavity therewithin with an aperture through the housing for emitting the audible alert.

13. The apparatus according to claim 9 further comprising:

receiver means for receiving a message; and controller means coupled to the receiver means and to the actuator means for presenting the message and one of the audible alert or the sub-audible or tactile alert in response to the message being received.

14. A selective call receiver comprising:

receiver means for receiving a message;

controller means coupled to the receiver means for presenting the message, the controller means also initiates an alert signal; and alert means coupled to the controller means for presenting one of an audible alert or a sub-audible or tactile alert in response to the alert signal, the alert means further comprising:

a housing;

a flexible member within the housing and coupled thereto;

a moving member coupled to the flexible member for movement about an equilibrium position, the moving member including a permanent magnet;

a diaphragm coupled to the moving member and located within the housing for generating the audible alert in response to movement of the moving member; and actuator means coupled to the moving member for causing the moving member to move at a first frequency for generating the audible alert and at a second frequency for generating the sub-audible or tactile alert, the actuator means including electromagnet means for causing the permanent magnet and the moving member to move, the movement at the second frequency being substantially transferred to the housing for generating the sub-audible or tactile alert.

15. The selective call receiver according to claim 14 wherein the controller means initiates the alert signal in response to receiving the message.

16. The selective call receiver according to claim 14 further comprising user control means coupled to the controller means for detecting user selection of the user control means, and wherein the controller means initiates the alert signal in response to user selection of the user control means.

17. The selective call receiver according to claim 14 wherein the diaphragm is resonant at the first frequency for generating the audible alert.

18. The selective call receiver according to claim 14 wherein the housing defines a cavity therewithin with an aperture through the housing for emitting the audible alert.

* * * * *